(12) United States Patent
Laing et al.

(10) Patent No.: US 7,026,616 B1
(45) Date of Patent: Apr. 11, 2006

(54) RADIATION DETECTION DEVICE, METHOD AND SYSTEM

(75) Inventors: Barrie Anderson Laing, Morgan Hill, CA (US); Ronald Orvis Smith, Gilroy, CA (US); Roland Fielder Hanson, Escondido, CA (US); Michael Laurance Smith, Santa Clara, CA (US); Iggoni Sunga Fajardo, Fremont, CA (US)

(73) Assignee: Radiation Detection Company, Gilroy, CA (US)

( * ) Notice: Subject to any disclaimer, the term of this patent is extended or adjusted under 35 U.S.C. 154(b) by 280 days.

(21) Appl. No.: 10/340,032

(22) Filed: Jan. 8, 2003

Related U.S. Application Data

(60) Provisional application No. 60/430,480, filed on Dec. 2, 2002.

(51) Int. Cl.
*G01T 1/11* (2006.01)
(52) U.S. Cl. ..................................... 250/337
(58) Field of Classification Search ................. 250/337
See application file for complete search history.

(56) References Cited

U.S. PATENT DOCUMENTS

| | | | | | |
|---|---|---|---|---|---|
| 3,786,254 A | * | 1/1974 | Yamashita et al. | ....... | 250/484.3 |
| 4,825,084 A | * | 4/1989 | Braunlich et al. | ....... | 250/484.3 |
| 4,975,589 A | * | 12/1990 | Chamberlain et al. | ... | 250/484.3 |
| 5,049,754 A | * | 9/1991 | Hoelscher et al. | ....... | 250/484.3 |

FOREIGN PATENT DOCUMENTS

FR    2648239 A1 * 12/1990

\* cited by examiner

*Primary Examiner*—Constantine Hannaher
(74) *Attorney, Agent, or Firm*—Haverstock & Owens LLP

(57) ABSTRACT

A device for performing thermoluminescent dosimetry and a method for making the same is disclosed. A thermoluminescent dosimetry device in accordance with the invention comprises a chip holder for holding thermoluminescent chips in free-space, such that the thermoluminescent chips are capable of being directly addressed after exposure to radiation. The chips are preferably suspended in free-space through support structures which minimize the contact with the thermoluminescent chips. A radiation detection device is preferably fabricated by placing the chip holder and a filter in a cup and thermally sealing a lid to edges of the cup.

24 Claims, 9 Drawing Sheets

RADIATION DETECTION DEVICE, METHOD AND SYSTEM

RELATED APPLICATION(S)

This patent application claims priority under 35 U.S.C. 119 (e) of the co-pending U.S. Provisional Patent Application Ser. No. 60/430,480 filed Dec. 2, 2002, and entitled "RADIATION DETECTION DEVICE, METHOD AND SYSTEM". The Provisional Patent Application Ser. No. 60/430,480 filed Dec. 2, 2002, and entitled "RADIATION DETECTION DEVICE, METHOD AND SYSTEM" is also hereby incorporated by reference.

FIELD OF THE INVENTION

This invention relates generally to radiation detection. More specifically, the invention relates to radiation detection devices, methods and systems using thermoluminescent dosimetry.

BACKGROUND OF THE INVENTION

Dosimetry generally refers to the measurement of a long term absorbed radiation dose, rather than some momentary radiation quantity or rate. A dosimetry device counts the total radiation dose over some time interval. Detection of the radiation is based on the interaction between the radiation and some material. This interaction can cause physical, chemical or biological changes depending on the nature of the material and the amount of the radiation energy absorbed into the material.

There are a number of different dosimetry methods currently used. For example, calorimetry is based on the ability of radiation to heat water, chemical dosimetry is based on the ionization ability of radiation in water, film dosimetry utilizes the darkening of a film caused by ionizing radiation and thermoluminescent dosimetry (TLD) utilizes thermally addressable energy generated by the radiation which is trapped or stored within a thermoluminescent material.

When a thermoluminescent material is irradiated, part of the absorbed energy is preserved in meta-stable energy levels of electron bands. The preserved energy may later be released by heating the material. Part of the released energy can be detected as visible light, and the amount of light that is detected can be correlated to a dose of radiation exposure.

Thermoluminescence is most commonly observed in crystalline materials which provide energy levels, or bands within an inorganic crystal lattice, where electrons and holes can be stored in one or more meta-stable states. For example, when an electron in a valence band receives enough energy it may advance to the conduction band. At the same time, a hole is formed to the valence band. In general these states are not stable. However, meta-stable energy levels or traps are formed between the conduction and valence band by adding some chemical impurities or by causing defects in the lattice structure, allowing meta-stable electrons and holes to remain trapped. When a thermoluminescent material is heated, the trapped electrons and holes are released and recombine resulting in the emission of detectable light which is then used to determine the dose of the radiation exposure.

A particularly sensitive thermoluminescent material is lithium-fluoride, which is doped with magnesium and titanium (LiF:Mg,Ti dosimeter). Thermoluminescent dosimetry can be used in a number of radiation measuring and monitoring applications including, personnel radiation monitoring, environmental radiation monitoring, radio-therapy monitoring and in scientific research, including geology. Therefore, there is a continued need to develop new devices, methods and systems for accurately and efficiently monitoring and measuring radiation using thermoluminescent dosimetry and thermoluminescent techniques.

SUMMARY OF THE INVENTION

The present invention is directed to thermoluminescent dosimetry devices, methods and systems. In accordance with the embodiments of the invention, a device comprises a holder unit for suspending a thermoluminescent medium within free-space of an optical window. In accordance with a preferred embodiment of the invention, a thermoluminescent dosimetry device comprises a holder unit with a plurality of optical windows and support structures for supporting a crystalline thermoluminescent medium, such as a lithium fluoride chip, within the free-space of each of the plurality of optical windows.

The aforementioned chip holder construction provides for the advantage of allowing the thermoluminescent chips to be directly addressed for measuring and/or detecting radiation exposures without interference from chip packaging materials that are typically used to hold chips within the chip holder through encapsulation.

Support structures, in accordance with the embodiments of the invention, are preferably configured to support the thermoluminescent chips at or near edges of the chips while using a minimal amount of contact surface to secure or hold the chips within the free-space. Minimizing the amount of contact surface area between the support structures and the chips help to reduce thermal conductivity between support structures and the chips which can lead to inaccurate readings while thermally addressing the chips.

In accordance with the embodiments of the invention, the support structures comprise one or more arm features that extend from a frame portion of the chip holder and into the optical window regions and clasps the chips in a bezel-like fashion. Alternatively, support structures comprise framing features that suspend and support the chips around the edges of chips, wherein the framing features comprise raised surfaces or dimples on regions where the framing features contact the chips.

A preferable device further comprises an identification means to identify the device with a user. The identification means is any type of unique indicator, but preferably is a bar code that is attached to, or printed on, the chip holder. The device also preferably comprises a filter unit configured to align filters with each of the optical windows of the chip holder allowing different types of radiation to be monitored with a single device. The device also preferably comprises a case or packaging to hold the chip holder and the filter unit and an attaching means for attaching the device to a user or an article of the user's clothing.

In accordance with the method of the present invention, a radiation detection device is fabricated by forming a thermoluminescent chip holder unit from a first section with a first set of apertures and a second section with a second and complementary set of apertures. Thermoluminescent chips are placed between the first set of apertures and the second set of apertures and the first section and the second section are coupled together, such that the chips are mounted in the free-space of each of the optical windows formed. Preferably, each of the first section and the second section comprise portions of the securing features for securing or suspending the chips in free-space.

In accordance with yet further embodiments of the invention, a radiation detection device is fabricated by packaging a thermoluminescent chip holder unit, such as described above, and filter unit in a thermoplastic cup with a thermoplastic lid sealed thereto.

DETAILED DESCRIPTION OF THE PREFERRED EMBODIMENT

A number of radiation detection devices use thermoluminescent chips which absorb radiation and store information regarding radiation exposure in the form of meta-stable energy states. These meta-stable energy states can be thermally addressed to provide a history and a measurement of the radiation exposure. Generally, to secure the thermoluminescent chips within the chip holder, the thermoluminescent chips are encapsulated in a material, such as Teflon™. Encapsulated thermoluminescent chips have several shortcomings when used for monitoring and measuring radiation. Different encapsulation materials absorb different amounts of radiation and/or scatter radiation differently, which leads to variations in the amount of radiation detected between devices and between detection regions within the same device, thereby making standardization of measurements a challenge. Further, encapsulation materials and air gaps are generally not uniform between devices and between chips within the same device, leading to further variations in the radiation absorbed by chips and radiation detected from the chips. Also, encapsulation materials are themselves often thermoluminescent and add a significant amount of background noise to the characteristic glow curve of a thermoluminescent chip. Accordingly, obtaining dosimetry from an encapsulated chip can require long signal process times and/or long data acquisition times.

Figure 1A:
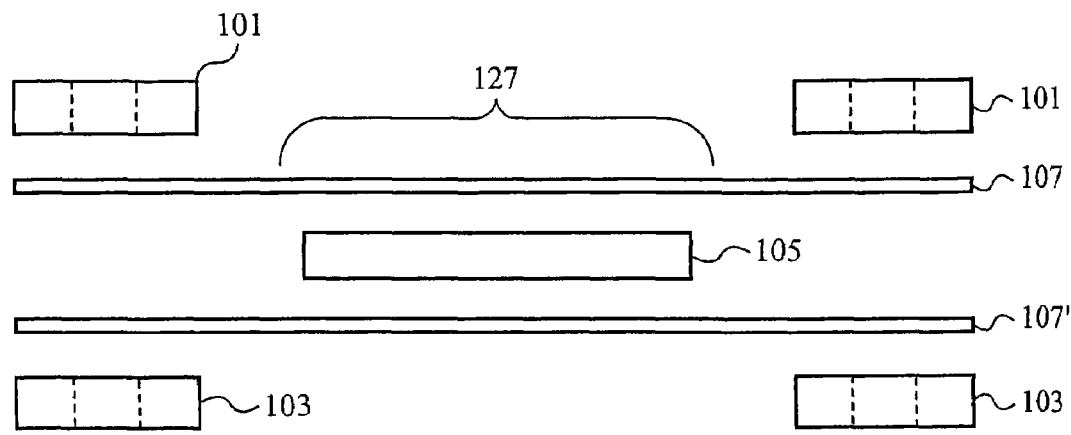
FIGS. 1A–C show a chip holder using encapsulation to secure a thermoluminescent chip within an optical window of the chip holder.
Figure 1B:
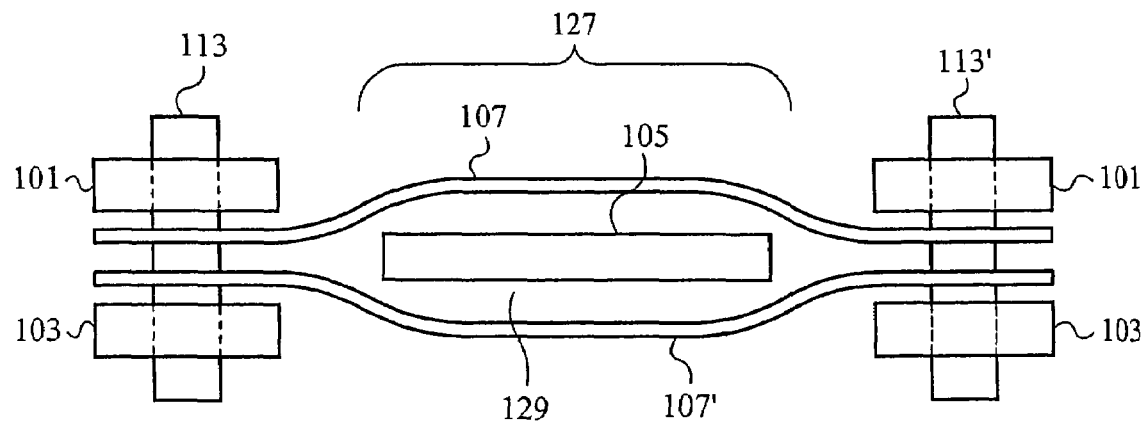
Figure 1C:
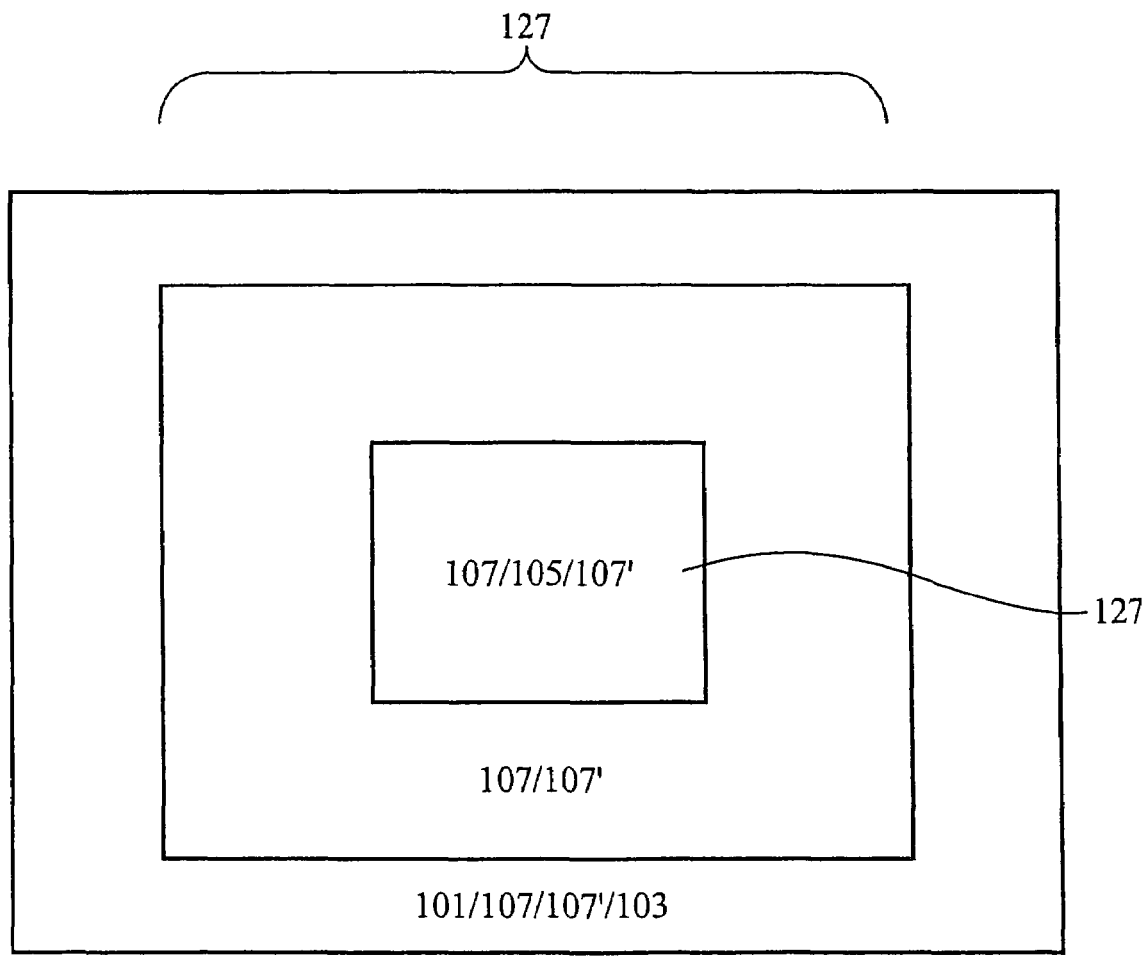

FIGS. 1A–C will be used to illustrate encapsulation of a thermoluminescent chip. While encapsulation of a single thermoluminescent chip is illustrated, it is understood that a typical radiation detection device has several encapsulated thermoluminescent chips. In accordance with encapsulation methods, a thermoluminescent chip 105 is placed between sheets of encapsulation material 107 and 107'. The sheets of encapsulation material 107 and 107' are generally formed from a material that is transparent to the radiation being detected, and is most commonly formed from Teflon™. After the chip 105 is placed between the sheets of encapsulation material 107 and 107', then the sheets of encapsulation material 107 and 107' are framed between a first framing structure 101 and a second framing structure 103, such as shown in FIG. 1B. The first framing structure 101 and the second framing structure 103 are then secured together through securing features 113 and 113', such as rivets or screws, thereby encapsulating the chip within the region 129.

FIG. 1C shows a top perspective view of the detection region 127 of a device with an encapsulated thermoluminescent chip 105, as described above. In use, the thermoluminescent chip is exposed to radiation through an optical window 127 comprising the sheets encapsulation materials 107 and 107'. Variations in air gaps in the region 129 (FIG. 1B), variations in contact of the encapsulation material 107 and 107' with the thermoluminescent chip 105 and the optical and/or thermal properties of the sheets of encapsulation materials 107 and 107' can all contribute to unreliable or inaccurate monitoring or measured radiation exposure.

Accordingly, the present invention is directed to a device and system, wherein a thermoluminescent media can be exposed and addressed without, or with minimal interface for encapsulation materials, such as those described above. The thermoluminescent media are preferably thermoluminescent chips that are suspended in optical free-space, thereby providing thermoluminescent chips in a radiation detection device that exhibits even cooling and which can be addressed at a faster rate than thermoluminescent chips that are encapsulated.

Figure 2A:
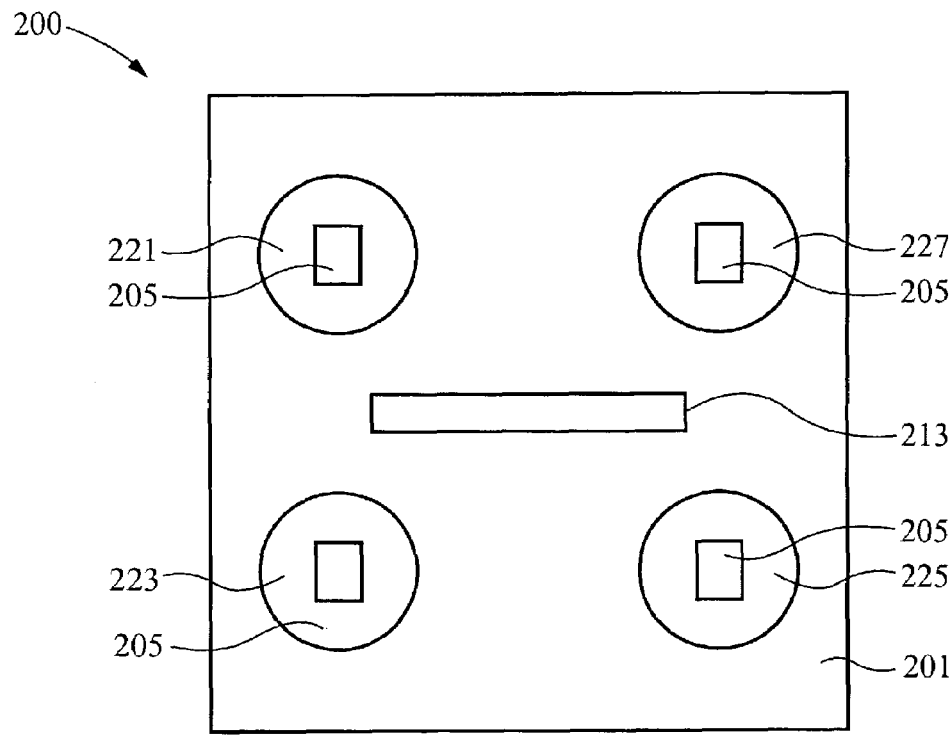
FIGS. 2A–C illustrate coupling a chip holder unit and a filter unit, in accordance with the embodiments of the invention.

Referring now to FIG. 2A, in accordance with the embodiments of the present invention, a radiation detection device comprises a chip holder 200 having a plurality of optical windows 221, 223, 225 and 227. Each of the optical windows 221, 223, 225 and 227 comprises a thermoluminescent chip 205 suspended within free-space.

Figure 2B:
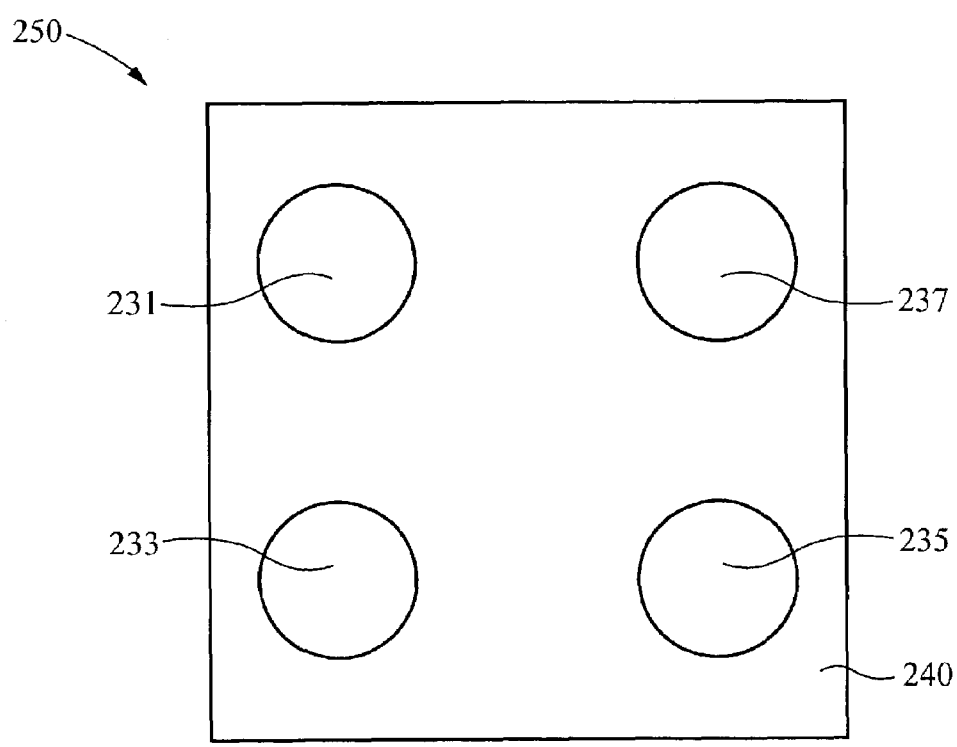

A radiation detection device, in accordance with further embodiments of the invention, comprises a filter unit 250, as illustrated in FIG. 2B. The filter unit 250 comprises filters 231, 233, 235 and 237 that are secured within a filter unit frame 240. The filters 231, 233, 235 and 237 can be the same filters, wherein each of the chips 205 are configured to absorb and detect the same type or intensity of radiation. Preferably, however, each of the filters 231, 233, 235 and 237 are different, wherein each chip 205 is configured to absorb and detect a different type or intensity of radiation.

Figure 2C:
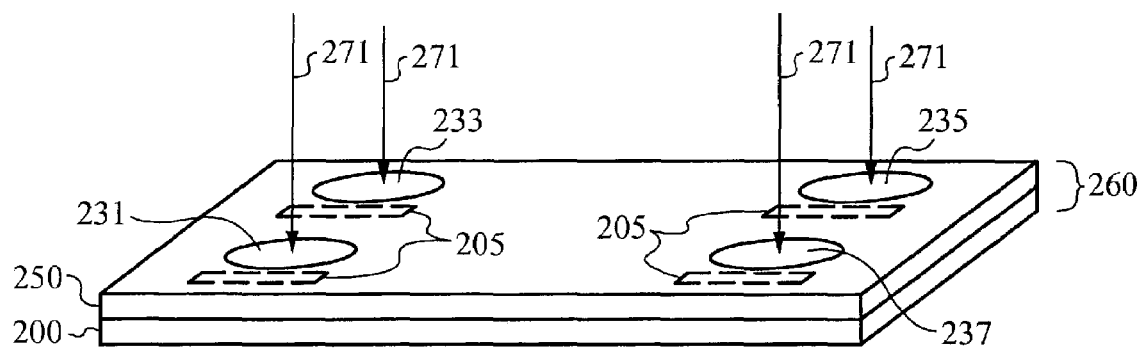

Now referring to FIG. 2C, in use a detection unit 260 is formed by aligning the chip holder 200 and the filter unit 250, such that filters 231, 233, 235 and 237 eclipse, or partially eclipse, the optical windows 221, 223, 225 and 227 of the chip holder 200. The chip holder 200 and the filter unit 250 are held together to form the detection unit 260, using any suitable securing means. Preferably, the chip holder 200 and the filter unit 250 are held together through a badge housing (not shown) or a cup and lid packaging, such as described in detail below. Also, preferably the chip holder 200 and/or the filter unit 250 have an identifier 213 for identifying the chip holder 200 and/or the filter unit 250 with a particular user. Preferably, the identifier 213 comprises a bar code that can be optically scanned into a database prior to addressing the chips 205, after addressing the chips 205 or while addressing the chips 205 to provide a record of the user's exposure to radiation.

In use, radiation, as indicated by the arrows 271 exposes the chips through the filters 231, 233, 235 and 237 and generates stored energy states, as explained previously. The chip holder 200 and the filter unit 250 are then separated and the thermoluminescent chips 205 are thermally addressed directly through the optical windows 221, 223, 225 and 227. In accordance with a preferred embodiment of the invention, the thermoluminescent chips are supported or suspended in optical free-space through one or more support structures.

Figure 3A:
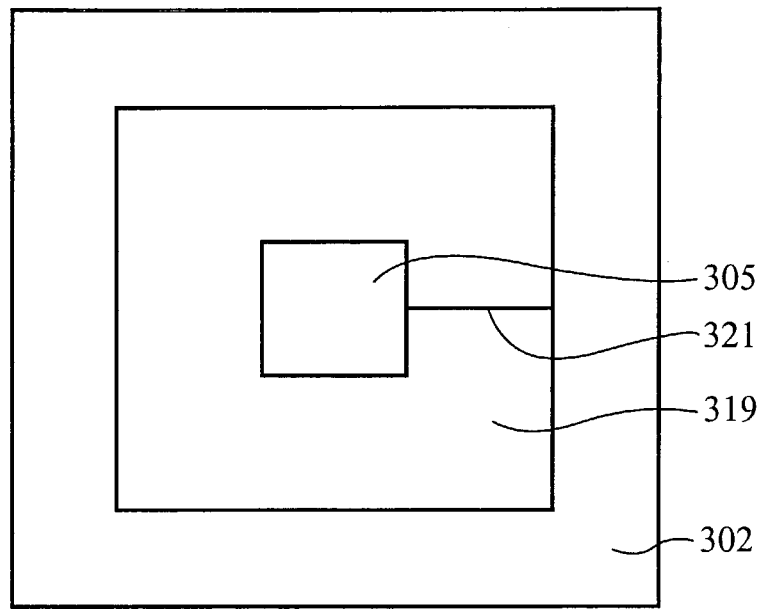
FIGS. 3A–B illustrate chip holder configurations with support structures for suspending a thermoluminescent chip in free-space, in accordance with the embodiments of the invention.

Referring now to FIG. 3A, a chip holder, in accordance with the embodiment of the invention comprises one or more detection regions 300. Each of the detection regions 300 has an outer framing structure 302 and a support structure 321 for supporting or suspending a thermoluminescent chip 305 in free-space of the optical window 319.

Figure 3B:
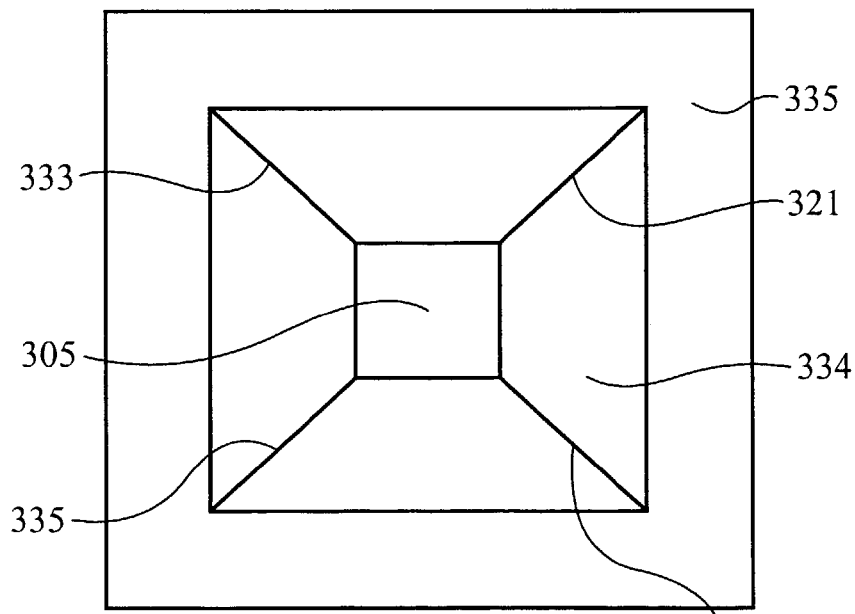

Now referring to FIG. 3B, a radiation detection device, in accordance with further embodiments of the invention, comprises one or more detection regions 325. Each of the detection regions 325 has a plurality of supporting structures 331, 333, 335 and 337 for supporting or suspending a thermoluminescent chip 305 in free-space of an optical window 334 and to an outer framing structure 335. The supporting structures 331, 333, 335 and 337 are configured to clasp the thermoluminescent chip 305 through edges of the chip 305 in a bezel-like fashion. Regardless of the number of support structures used to support or suspend the thermoluminescent chip 305, or the particular construction of the support features used, preferably, the support features couple the thermoluminescent chip 305 at, near and/or around edges of the thermoluminescent chip 305 to minimize contact with the thermoluminescent chip 305.

Figure 4A:
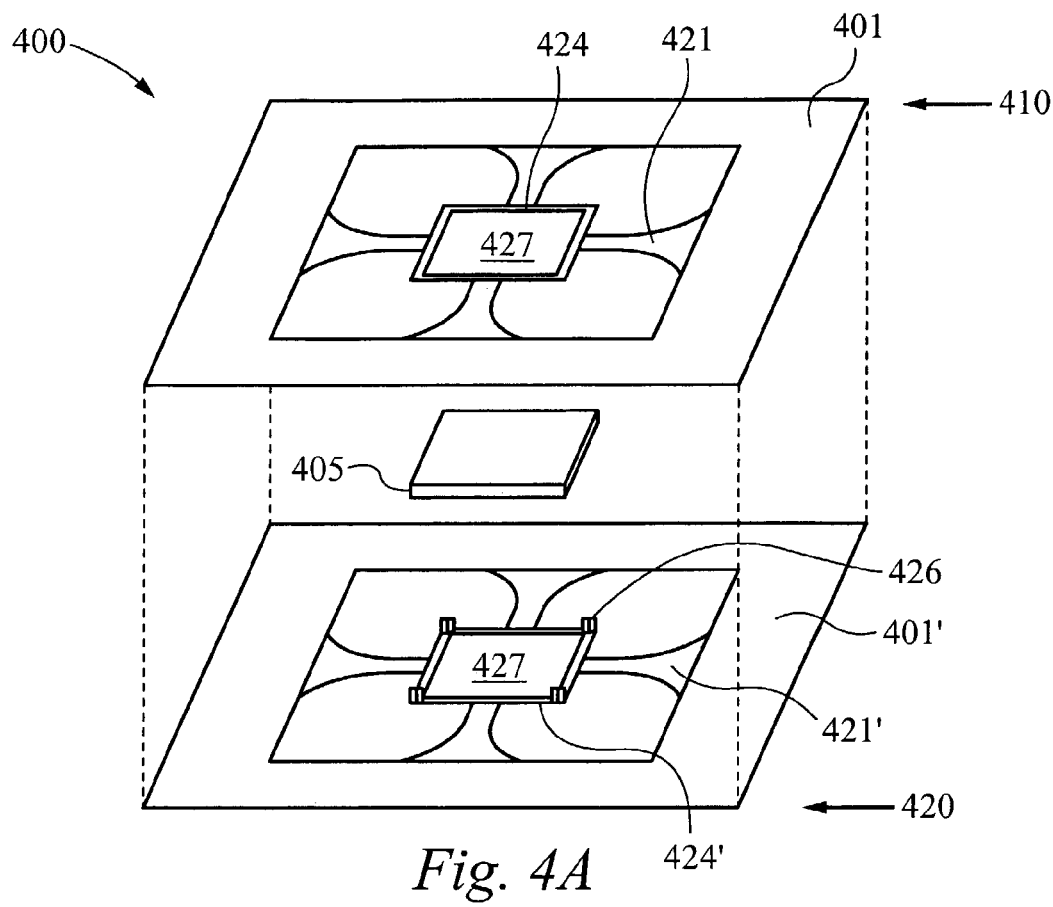
FIGS. 4A–B show a chip holder configuration with support structures including framing features for suspending a thermoluminescent chip in free-space, in accordance with the embodiments of the invention.

Now referring to FIG. 4A, in accordance with a preferred embodiment of the invention, a detection region 400 of a radiation detection device has a first support section 410 having a first outer support region 401, a first framing feature 424 and a first set of arm features 421 for coupling the first framing feature 424 to the outside support region 401. The detection device region 400 also preferably has a second, and complementary, support section 420, with a second outside support region 401', second framing features 424' and a second set of arm features 421' for coupling the second framing features 424' to the second outside support section 401'. Preferably, the second framing feature 421 further comprises a plurality of prong features 426 for laterally supporting a thermoluminescent chip 405 between the frame features 424 and 424' with the thermoluminescent chip 405 sandwiched between the first support section 410 and the second support section 420.

Still referring to FIG. 4A, in use the first support section 410 and the second support section 420 are coupled together with the thermoluminescent chip 405 therebetween, such that the thermoluminescent chip 405 is supported and suspended in the free-space of the optical window 427, formed by the first framing feature 424 and the second framing feature 424'. The first support section 410 and the second support section 420 are held together by any suitable means, including, but not limited to, clasps, snaps, screws and rivets. A radiation detection device, in accordance with the embodiments of the present invention, preferably comprises a chip holder with a plurality of detection regions 400, such as described above, a filter unit, means to align the chip holder and the filter unit and means for attaching the radiation detection device to a user, as described below.

Figure 4B:
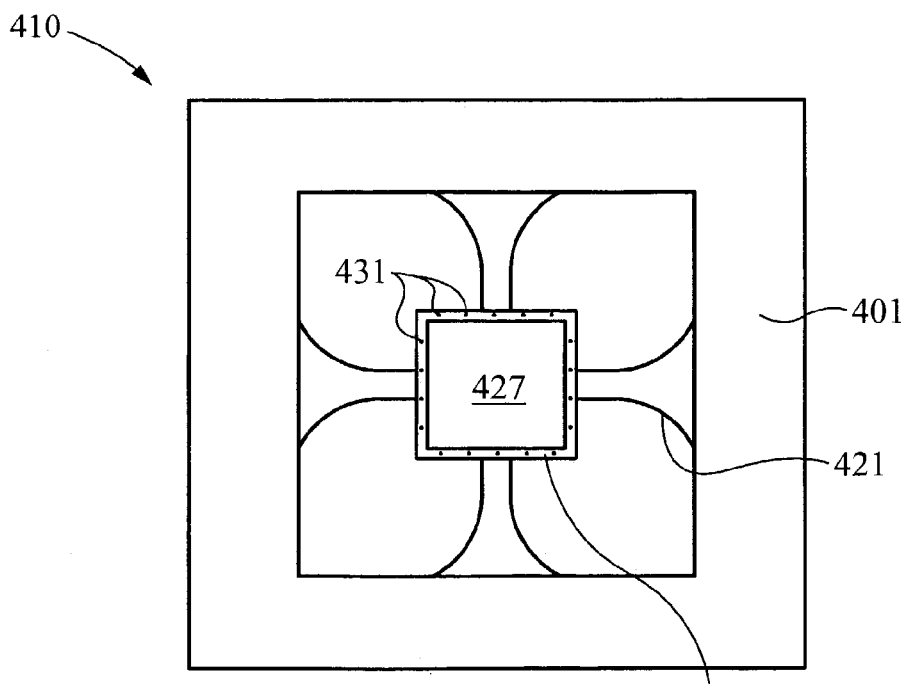

Referring now to FIG. 4B, a support section 410 preferably comprises a framing feature 424 with dimples or raised features 431 that extend along the parameter of the framing feature 424. The dimples or raised features 431 contact the thermoluminescent chip 405, and minimize contact with framing feature 424. Preferably, the support section 420 (FIG. 4A) is also configured with a framing feature 424' having dimples or raised features along the contacting perimeter of the framing feature 424' to further minimize contact with the thermoluminescent chip 405. While any number of different configurations for supporting and/or suspending thermoluminescent chips in optical free-space of a chip holder are contemplated, the configuration that is chosen preferably supports chips at, near or around edges of the thermoluminescent chips to minimize contact and reduce thermal conductivity between framing features and/or support features and the thermoluminescent chips. Further, the framing features 424 ans 424', with or without dimples or raised features 431, provide ducts or channels to control the flow or dissipation of hot gas from around and away form the chip 405 while addressing the chip 405, whereas encapsulated chips of prior art devices depend on the dissipation of heat through the encapsulation material and can not readily cooled by a moving gas stream.

Figure 5:
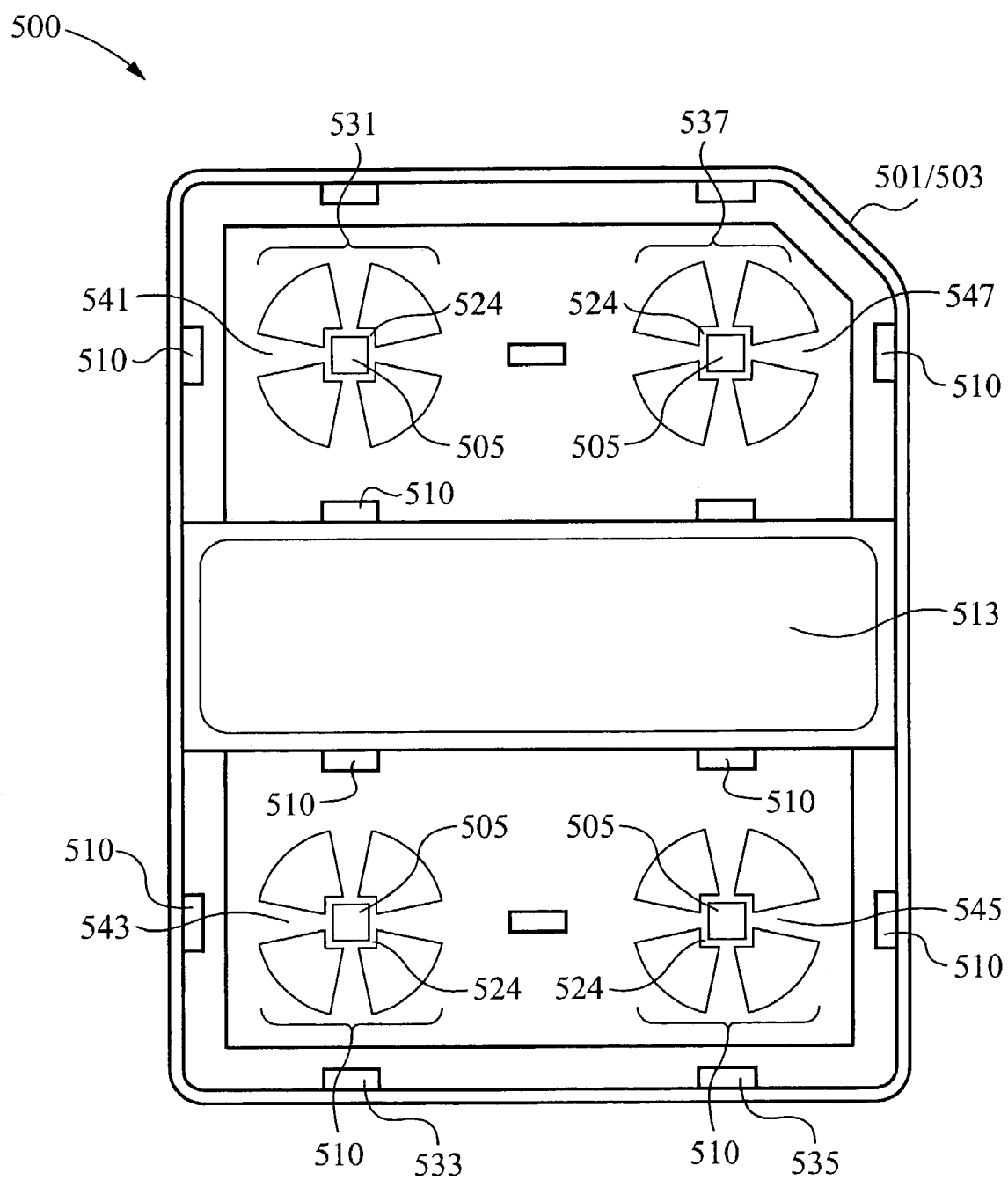
FIG. 5 shows a chip holder, in accordance with a preferred embodiment of the invention.

Now referring to FIG. 5, in accordance with the embodiments of the invention, a chip holder 500 has a first support section 501 and a second support section 503 that are coupled together through securing features 510 and form a plurality of detection regions 531, 533, 535 and 537. Each of the detection regions 531, 533, 535 and 537 preferably has a thermoluminescent chip 505 that is suspended in optical free-space of the detection regions 531, 533, 535 and 537 through framing features 524 and support arms 541, 543, 545 and 547, such as described in detail above. The chip holder 500 also preferably has an identification region 513 for attaching an identification tag (not shown), such as a bar code tag, to identify the chip holder 500 with a user.

Figure 6:
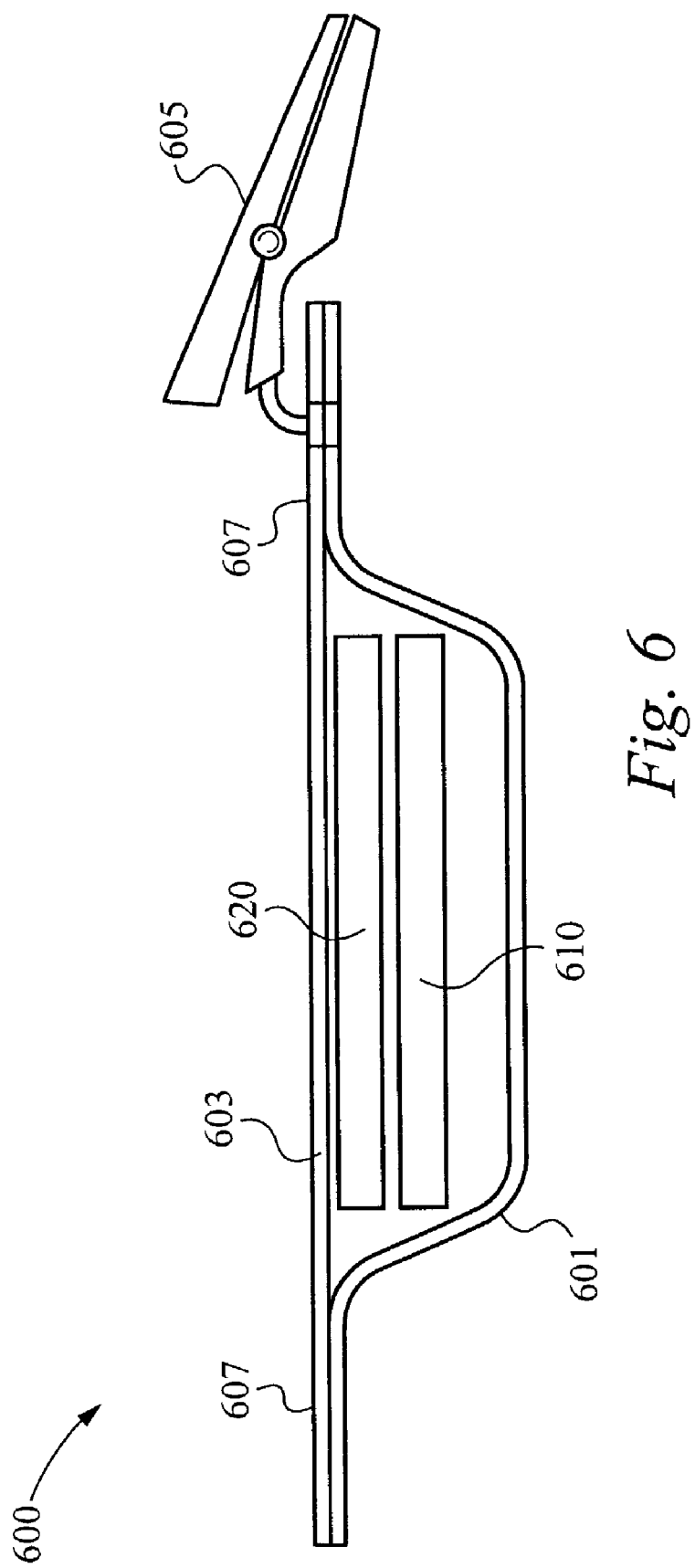
FIG. 6 shows a radiation detection device comprising a chip holder unit and a filter unit encapsulated within a thermoplastic package, in accordance with the method of the invention.

Referring now to FIG. 6, a radiation detection device 600, in accordance with a preferred embodiment of the invention comprises a chip holder 610 and a filter unit 620, such as described above. The chip holder 610 and the filter unit 620 are preferably packaged within a cup structure 601 and a lid structure 603. The cup structure 610 and the lid structure 620 are preferably thermally sealed around contact edges 607 between the cup structure 601 and the lid structure 603. The device 600, also preferably comprises an attachment means 605, such as a hook or alligator clip, for attaching the device 600 to a user and/or an article of the user's clothing.

Figure 7:
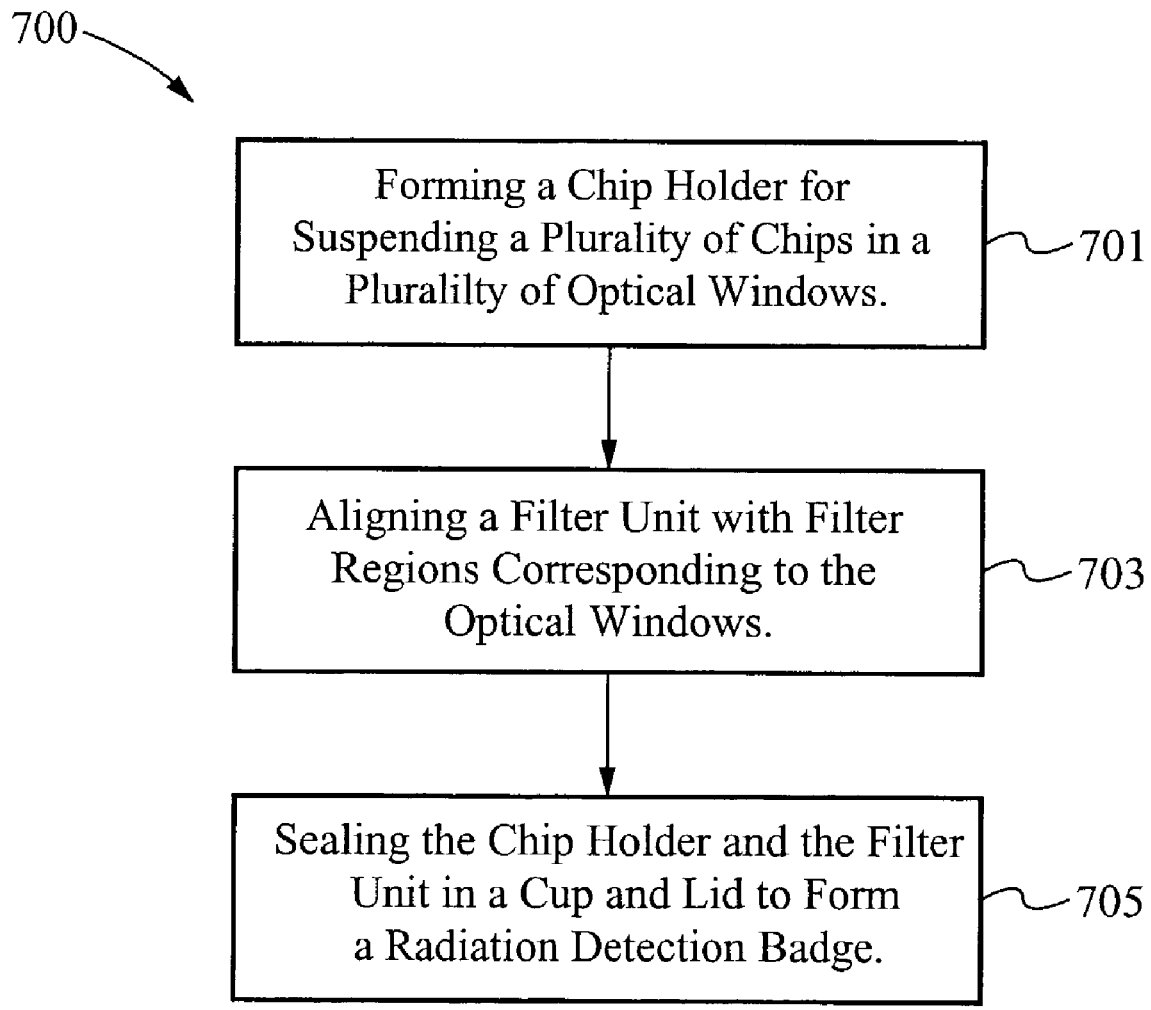
FIG. 7 is a flow-chart outlining steps of fabricating a radiation detection device, such as shown in FIG. 6.

FIG. 7 is a flow-chart 700 outlining steps of making a radiation detection device, such as shown in FIG. 6. In accordance with the method of the present invention, in the step 701, a chip holder for suspending a plurality thermoluminescent chips in optical free-space is formed. Preferably, the thermoluminescent chips are suspended at, near or around their edges in the optical free-space and the chip holder is formed in parts that are secured together with the thermoluminescent chips sandwiched therebetween, as described above. After the chip holder is formed in the step 701, then in the step 703, a filter unit with filters corresponding to locations of the thermoluminescent chips is aligned with the chip holder. After the chip holder and the filter unit are aligned in the step 703, then in the step 705, the chip holder and the filter unit are sealed within a cup structure and a lid structure to form a radiation detection device, such as shown in FIG. 6. Preferably, the chip holder and the filter unit are thermally sealed within a cup structure and a lid structure. However, other methods of sealing the chip holder and the filter unit within a cup structure and lid structure are contemplated including, but not limited to, riveting and/or glueing the cup structure and lid structure together. The step 703 of aligning the chip holder and the filter unit, in accordance with the embodiments of the invention, is accomplished by placing the chip holder and the filter unit in the cup structure, wherein the cup structure itself aligns the chip holder with the filter unit.

The device of the present invention is capable of providing more reliable dosimetry because detection media, such as thermoluminescent chips, are suspended in optical free-space, reducing optical and thermal interference typically associated with encapsulation materials. Further, because of the high quality (high signal to noise ration) of the detection signal (i.e. the characteristic glow curve), as a result of good cooling, minimal thermal and minimal optical interference, thermoluminescent chips used in the device of the present invention are capable of being addressed at a much faster rate than encapsulated thermoluminescent chips. Further, packaging elements of a radiation detection device in a cup and lid packaging construction provides for a low cost and tamper proof method for making radiation detection devices.

While the present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A thermoluminescent dosimetry device comprising:
   a holder for suspending a thermoluminescent medium within free-space of an unobstructed optical window;
   a filter configured to be aligned with the optical window; and
   a case for packaging the holder and the filter, wherein the case comprises a cup and a lid thermally sealed to the cup.

2. The device of claim 1, wherein the holder comprises one or more support structures for framing the thermoluminescent medium.

3. The device of claim 1, wherein the holder is configured for suspending a crystalline thermoluminescent medium within the free-space.

4. The device of claim 1, wherein the holder comprises means to identify the holder with a user.

5. The device of claim 4, wherein the means to identify the holder with the user comprises a bar code.

6. The device of claim 1, further comprising means for attaching the case to clothing.

7. A thermoluminescent dosimetry device comprising:
   a chip holder with a plurality of optical windows;
   support structures for securing thermoluminescent chips within free-space of each of the plurality optical windows, such that substantial portions of the thermoluminescent chips are capable of being directly addressed while secured within the chip holder;
   a filter unit with a plurality of filters configured to be aligned with the plurality of optical windows; and
   a case for holding the chip holder and the filter unit, wherein the case comprises a cup and a lid thermally sealed to the cup.

8. The device of claim 7, wherein the support structures comprise one or more arm features.

9. The device of claim 8, wherein the support structures further comprise frame features for framing the thermoluminescent chips.

10. The device of claim 9, wherein surfaces of the frame features comprise raised features to reduce contact of the frame features with the thermoluminescent chips.

11. The device of claim 10, wherein the chip holder comprises a first section and a second section, each comprising portions of the frame features, wherein the first section and the second section are coupled together to secure the thermoluminescent chips therebetween.

12. The device of claim 10, wherein the chip holder comprises a single section to secure the thermoluminescent chips.

13. The device of claim 9, wherein surfaces of the frame features comprise an insulating material to reduce contact of the frame features with the thermoluminescent chips.

14. The device of claim 7, further comprising an identification means for identifying the device with a user.

15. A method of making a radiation detection device comprising forming a thermoluminescent chip holder unit, wherein forming the thermoluminescent chip holder unit comprises:
    placing a plurality of thermoluminescent chips between a first section with a first set of apertures and second section with a second set of apertures;
    coupling the first section and the second section with thermoluminescent chips therebetween, such that the thermoluminescent chips are mounted in free-space of the optical windows formed by the apertures of the first section and the second section; and
    packaging the thermoluminescent chip holder unit and a filter unit comprising one or more filters by
       placing the thermoluminescent chip holder unit and the filter unit in a thermoplastic cup; and
       thermally sealing a thermoplastic lid around edges of the thermoplastic cup.

16. The method of claim 15, wherein the first section and the second section comprises securing features for contacting edges of the thermoluminescent chips.

17. The method of claim 16, wherein the securing features frame the thermoluminescent chips.

18. The method of claim 17, wherein the securing features comprise raised features on surfaces which contact the thermoluminescent chips.

19. The method of claim 17, wherein the securing features comprise insulating features on surfaces which contact the thermoluminescent chips.

20. A method of making a radiation detection device comprising:
    forming a thermoluminescent chip holder unit having a single section and one or more unobstructed optical windows;
    placing one or more thermoluminescent chips within the one or more unobstructed optical windows and held within the single section; and
    packaging the thermoluminescent chip holder unit and a filter unit comprising filters by
       placing the thermoluminescent chip holder unit and the filter unit in a thermoplastic cup; and
       thermally sealing a thermoplastic lid around edges of the thermoplastic cup.

21. The method of claim 20, wherein the single section comprises securing structures for contacting edges of the thermoluminescent chips.

22. The method of claim 21, wherein the securing structures frame the thermoluminescent chips.

23. The method of claim 21, wherein the securing structures comprise raised features on surfaces which contact the thermoluminescent chips.

24. The method of claim 21, wherein the securing structures comprise insulating features on surfaces which contact the thermoluminescent chips.

* * * * *